US007346066B2

(12) United States Patent
Nealon

(10) Patent No.: US 7,346,066 B2
(45) Date of Patent: Mar. 18, 2008

(54) INTEGRATED BROADBAND AND NARROWBAND SS7 SIGNALING GATEWAY WITH M3UA AND POINT CODE MAPPING

(75) Inventor: Robert J. Nealon, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 901 days.

(21) Appl. No.: 10/665,778

(22) Filed: Sep. 19, 2003

(65) Prior Publication Data

US 2005/0063371 A1 Mar. 24, 2005

(51) Int. Cl.
*H04L 12/50* (2006.01)
*H04Q 11/00* (2006.01)
*H04Q 7/24* (2006.01)

(52) U.S. Cl. .................. 370/401; 370/338; 370/373; 370/399; 709/200

(58) Field of Classification Search ........ 370/230–254, 370/338–352, 389–395, 401–410; 709/228; 455/560
See application file for complete search history.

(56) References Cited

U.S. PATENT DOCUMENTS

| 6,496,508 | B1 * | 12/2002 | Breuckheimer et al. | 370/397 |
|---|---|---|---|---|
| 6,795,444 | B1 * | 9/2004 | Vo et al. | 370/401 |
| 6,952,433 | B1 * | 10/2005 | Stumpert et al. | 370/524 |
| 6,990,089 | B2 * | 1/2006 | Benedyk et al. | 370/338 |
| 7,085,260 | B2 * | 8/2006 | Karaul et al. | 370/352 |
| 7,139,263 | B2 * | 11/2006 | Miller et al. | 370/352 |
| 7,197,036 | B2 * | 3/2007 | Craig | 370/392 |
| 2001/0017861 | A1 * | 8/2001 | Allen et al. | 370/399 |
| 2002/0048268 | A1 * | 4/2002 | Menon et al. | 370/349 |
| 2003/0231623 | A1 * | 12/2003 | Ryu et al. | 370/352 |
| 2004/0068534 | A1 * | 4/2004 | Angermayr et al. | 709/200 |
| 2004/0233896 | A1 * | 11/2004 | Lin et al. | 370/352 |
| 2004/0240456 | A1 * | 12/2004 | Picha | 370/401 |

* cited by examiner

*Primary Examiner*—Man U. Phan

(57) ABSTRACT

A method and system provide for using an integrated broadband and narrowband SS7 signaling gateway with M3UA and point code mapping. In general terms one embodiment of the system has: a single physical media carrying at least one bearer path and at least one signaling link, the physical media being operatively connected to a signaling network; and an integrated media and signaling gateway operatively connected to the physical media, the integrated gateway being a termination for both the bearer path and the signaling link.

21 Claims, 3 Drawing Sheets ained by taking the entire specification, claims, drawings, and abstract as a whole.

INTEGRATED BROADBAND AND NARROWBAND SS7 SIGNALING GATEWAY WITH M3UA AND POINT CODE MAPPING

TECHNICAL FIELD

The present invention relates to wireless telephony in general, and, more particularly, to embodiments of a method and system relating to an integrated broadband and narrowband SS7 signaling gateway with M3UA and point code mapping.

BACKGROUND OF THE INVENTION

It is increasingly more common for telephone companies to offload voice calls from public switched telephone networks (PSTNs) to voice-over-Internet Protocol (VoIP) networks because, for example, it is cheaper to carry voice traffic over Internet Protocol (IP) networks than over switched circuit networks.

A VoIP network carries voice traffic cheaper than a switched circuit telephone network because IP telephony networks make better use of available bandwidth. In a public switched telephone network, for example, a dedicated 64 kilobits per second (kbps) end-to-end circuit is allocated for each call. In a VoIP network, digitized voice data is highly compressed and carried in packets over IP networks. Using the same bandwidth, a VoIP network can carry many times the number of voice calls as a switched circuit network with better voice quality.

In addition to voice data, signaling data is exchanged between switched circuit telephone networks and VoIP networks. Signaling information is used to setup, manage and release voice calls, and support telephony services such as caller ID, toll-free calling, and mobile authentication and roaming services.

Switched circuit telephone networks use an SS7 network for signaling. There are three kinds of signaling end points: Service Switching Point (SSP or central office switch); Signal Transfer Point (STP); and Service Control Point (SCP). In SS7 networks, ISUP (Integrated Services Digital Network (ISDN) User Part) signaling messages are used to setup, manage and release trunk circuits that carry voice calls between central office switches. ISUP messages also carry caller ID information, such as the calling party's telephone number and name. ISUP is used for both ISDN and non-ISDN calls between central office switches.

VoIP networks carry SS7-over-IP using protocols defined by Signaling Transport (sigtran) working group of the Internet Engineering Task Force (IETF), the international organization responsible for recommending Internet standards. The sigtran protocols support the stringent requirements for SS7/C7 signaling as defined by International Telecommunication Union (ITU) Telecommunication Standardization Sector.

In IP telephony networks, signaling information is exchanged between the following functional elements: Media Gateway, Media Gateway Controller, and Signaling Gateway. A media gateway terminates voice calls on interswitch trunks from the public switched telephone network, compresses and packetizes the voice data, and delivers compressed voice packets to the IP network. For voice calls originating in an IP network, the media gateway performs these functions in reverse order. For ISDN calls from the PSTN, Q.931 signaling information is transported from the media gateway to the media gateway controller for call processing. A media gateway controller handles the registration and management of resources at the media gateway(s). A media gateway controller exchanges ISUP messages with central office switches via a signaling gateway. Because vendors of media gateway controllers often use off-the-shelf computer platforms, a media gateway controller is sometimes called a softswitch. A signaling gateway provides transparent interworking of signaling between switched circuit and IP networks. The signaling gateway may terminate SS7 signaling or translate and relay messages over an IP network to a media gateway controller or another signaling gateway.

In the prior art separate signaling gateway and media gateway are used and are dedicated to different functions. Different point codes are needed for the signaling gateway and the call controller, and routing entries are needed to reach the call controller.

SUMMARY

The following summary of embodiments of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of an embodiment of the present method and system to provide a method and system relating to an integrated broadband and narrowband SS7 signaling gateway with M3UA and point code mapping. In general terms one embodiment of the system has: a single physical media carrying at least one bearer path and at least one signaling link, the physical media being operatively connected to a signaling network; and an integrated media and signaling gateway operatively connected to the physical media, the integrated gateway being a termination for both the bearer path and the signaling link.

In another embodiment the present system has: a single media carrying at least one bearer path in a bearer logical channel and at least one signaling link in a signaling logical channel; an integrated media and signaling gateway having a bearer processing unit that is a termination for the bearer logical channel and a signal processing unit that is a termination for the signaling logical channel; a network operatively connected to the bearer processing unit; a call controller operatively connected to the signal processing unit, the call controller having assigned thereto a point code; and a point code cloning scheme that effects a cloning of the point code assigned to the call controller and a cloning of point codes of network elements in the network that are operatively connected to the gateway.

Embodiments of the present method may have the steps of: carrying, on a single physical media, at least one bearer path and at least one signaling link, the physical media being operatively connected to a signaling network; terminating the bearer paths and the signaling links with a common integrated media and signaling gateway; and cloning, with a point code cloning scheme, a point code assigned to the call controller and cloning point codes of network elements in the network that are operatively connected to the gateway. The point code cloning scheme may transparently forward a SS7 signaling message between the SS7 network and the call controller.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

Figure 1:
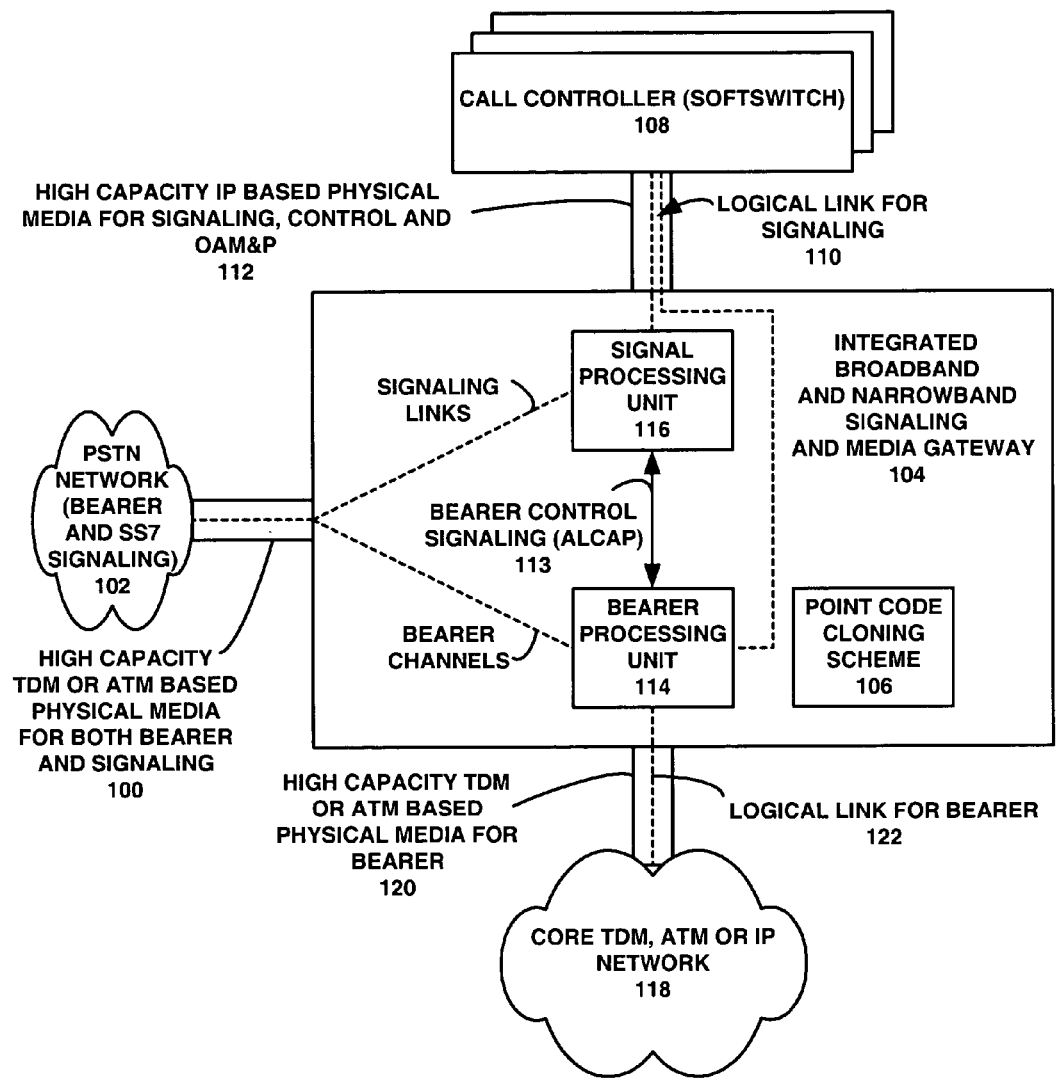
FIG. 1 depicts a block diagram illustrative of one embodiment of an integrated media and signaling gateway.

The particular values and configurations discussed in these non-limiting examples can be varied and are cited merely to illustrate an embodiment of the present invention and are not intended to limit the scope of the invention.

The integrated media and signaling gateway provides a way for service providers to transport the signaling links on the same physical media used for transporting bearer. With the point code cloning scheme, the signaling gateway transparently forwards the signaling messages between the signaling network and the call controller (also known as a softswitch).

The present system and method integrates the media gateway function and the signaling gateway function into one component. In the integrated media and signaling gateway, bearer paths for voice and data, and signaling links for bearer control share the same physical media and are terminated on the same interface. The data carried by the bearer paths and signaling links are then forwarded to different processing units through the switching fabric in the gateway. Logical channels for bearer (voice and data) are terminated on bearer manipulation hardware, such as DSPs (Digital Signal Processors) or network processors, and are processed according to the data type and destinations. However, logical channels for signaling are terminated on general purpose CPUs where the signaling messages are processed. In the integrated signaling gateway, the incoming SS7 signaling connected to the SS7 network may be either TDM based narrowband signaling or ATM based broadband signaling. The signaling processing unit then converts the TDM or ATM based connection oriented signaling link to IP based network with M3UA and forwards the SS7 signaling over IP to the call controller (also called softswitch).

In the signaling network, each network element is identified by a unique point code. The traffic in the signaling network is then routed based on the point code. A point code mapping (or cloning) scheme is designed such that the integrated signaling gateway clones the point code, which is assigned to the call controller (softswitch), towards the signaling network and the integrated signaling gateway clones all point codes of the network elements it is connected to in the signaling network towards the call controller (softswitch). This cloning mechanism makes the call controller (softswitch) and all network elements in the signaling network feel like that they are all directly connected to each other. The integrated signaling gateway transparently forwards the signaling message to the right destination without its own point code.

In general, M3UA is a protocol defined by the IETF SIGTRAN Working Group for transporting MTP Level 3 user part signaling messages (e.g., ISUP, TUP, and SCCP) over IP using the Stream Control Transmission Protocol (SCTP). TCAP or RANAP messages, as SCCP user protocols, may be carried by SCCP using M3UA or by a different SIGTRAN protocol called SUA.

As known in the art, M3UA is used between a signaling gateway and a media gateway controller or IP telephony database. The signaling gateway receives SS7 signaling using MTP as transport over a standard SS7 link. The signaling gateway terminates MTP-2 and MTP-3 and delivers ISUP, TUP, SCCP and/or any other MTP-3 user messages, as well as certain MTP network management events, over SCTP associations to media gateway controllers or IP telephony databases.

Also as known in the art, the ISUP and/or SCCP layer at an IP signaling point is unaware that the expected MTP-3 services are not provided locally, but rather by the remote signaling gateway. Similarly, the MTP-3 layer at a signaling gateway may be unaware that its local users are actually remote parts over M3UA. Conceptually, M3UA extends access to MTP-3 services at the signaling gateway to remote IP endpoints. If an IP endpoint is connected to more than one signaling gateway, the M3UA layer at the IP endpoint maintains the status of configured SS7 destinations and route messages according to the availability and congestion status of the routes to these destinations via each signaling gateway. At the signaling gateway, the M3UA layer provides interworking with MTP-3 management functions to support seamless operation of signaling between the SS7 and IP networks. For example, the signaling gateway indicates to remote MTP-3 users at IP endpoints when an SS7 signaling point is reachable or unreachable or when SS7 network congestion or restrictions occur. The M3UA layer at an IP endpoint keeps the state of the routes to remote SS7 destinations and may request the state of remote SS7 destinations from the M3UA layer at the signaling gateway. The M3UA layer at an IP endpoint may also indicate to the signaling gateway that M3UA at an IP endpoint is congested.

FIG. 1 depicts an embodiment of the present system for transporting signaling links and bearer on the same media. A single physical media 100 carries at least one bearer path and at least one signaling link, the physical media 100 being operatively connected to a PSTN (public switched telephone network) network (bearer and SS7 signaling) 102. The physical media 100 may be a high capacity TDM or ATM based physical media for both bearer and signaling. An integrated media and signaling gateway 104 is operatively connected to the physical media 100, the integrated media and signaling gateway 104 being a termination for both the bearer path and the signaling link.

A point code cloning scheme 106 is provided in the integrated signaling gateway 104 for transparently forwarding a signaling message between the PSTN network 102 and at least one call controller 108. The call controller 108 is connected to the integrated signaling gateway 104 by a logical link for signaling 110, which may be carried by a high capacity IP based physical media 112 for signaling, control and OAM&P. The call controller 108 provides call control signaling (that may be wireless protocols encapsulated in M3UA) and media control signaling (that may be H.248).

The integrated signaling gateway 104 thus transparently forwards the signaling message to a correct destination without the integrated signaling gateway's own point code. The incoming signaling to the integrated signaling gateway 104 may be at least one of TDM based narrowband signaling and ATM based broadband signaling. The at least one of TDM based narrowband signaling and ATM based broadband signaling is converted to IP based network signaling with M3UA.

The single media 100 carries at least one bearer path in a bearer logical channel and at least one signaling link in a signaling logical channel. The integrated media and signaling gateway 104 has a bearer processing unit 114 that is a termination for the bearer logical channel and a signal processing unit 116 that is a termination for the signaling logical channel. A network 118 may be operatively connected to the bearer processing unit 114 by a high capacity TDM or ATM or IP based physical media 120 for bearer. The physical media 120 carries the logical link 122 for bearer. As depicted in FIG. 1, bearer control signaling occurs between the signal processing unit 116 and the bearer processing unit 114.

The call controller 108 may be operatively connected to the signal processing unit 116. The point code cloning scheme 106 effects a cloning of the point code assigned to the call controller 108 and a cloning of point codes of network elements in the network 118 that are operatively connected to the gateway 104.

Figure 2:
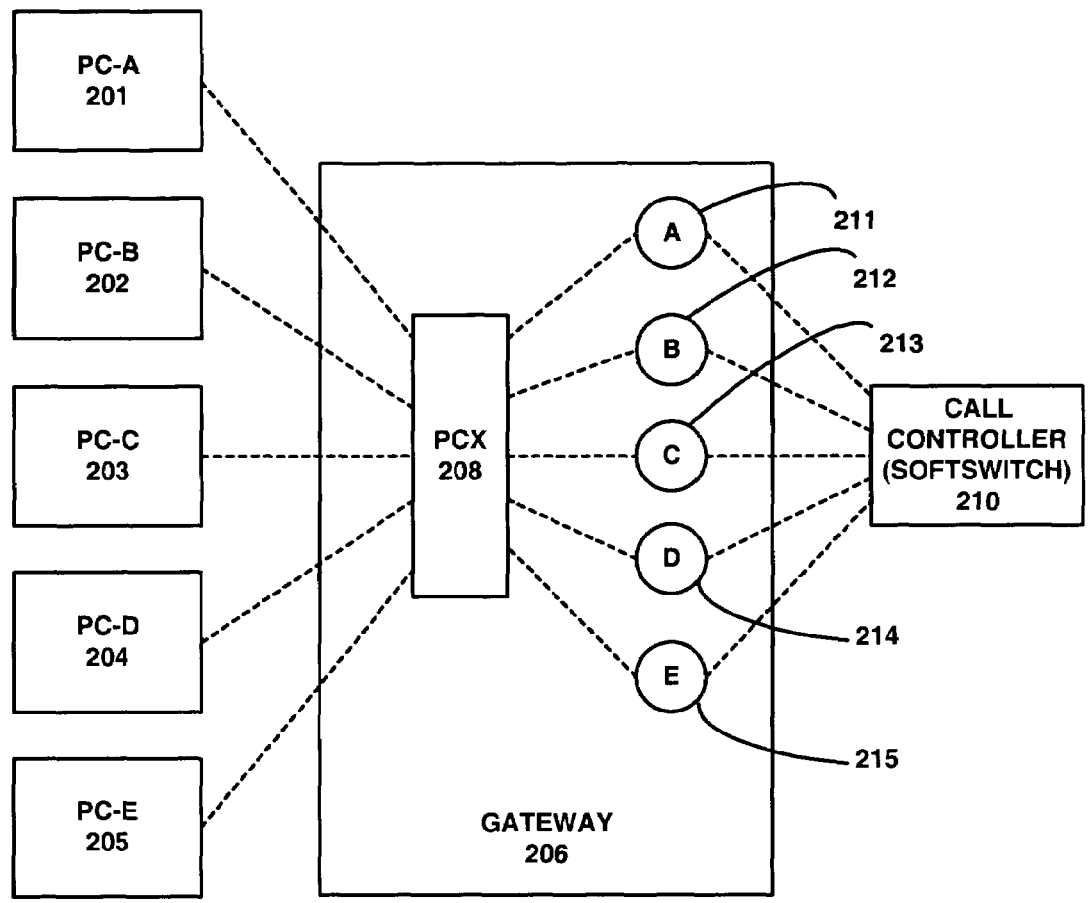
FIG. 2 depicts a block diagram illustrative of one embodiment of point code cloning for use in the integrated signaling gateway.

FIG. 2 is a schematic illustration of point code cloning. Actual point codes PC-A 201, PC-B 202, PC-C 203, PC-D 204, and PC-E 205 are operatively connected to gateway 206 via PCX 208. The call controller 210 is operatively connected to the gateway 206 via the logical point codes A'211, B'212, C'213, D'214, and E'215. The actual point codes PC-A 201, PC-B 202, PC-C 203, PC-D 204, and PC-E 205 are related to network elements. The logical point codes A'211, B'212, C'213, D'214, and E'215 are used when running SS7 over IP and not TDM.

Figure 3:
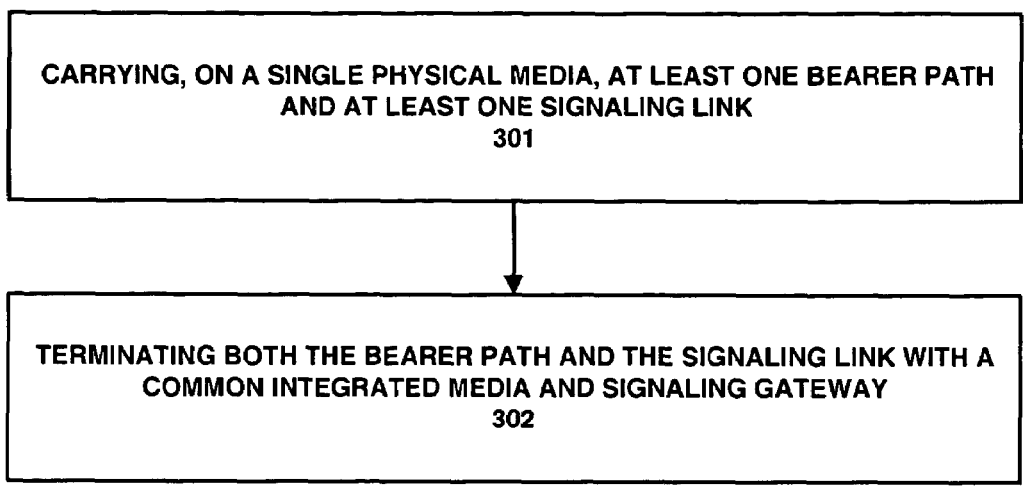
FIG. 3 illustrates a very general flow chart of logical operational steps that may be followed in accordance with one embodiment of the present method and system.

FIG. 3 depicts in general terms an embodiment of the present method for transporting signaling links and bearer on the same media. In this embodiment the method has the steps of: carrying, on a single physical media, at least one bearer path and at least one signaling link, the physical media being operatively connected to a signaling network (step 301); and terminating the bearer paths and the signaling links with a common integrated media and signaling gateway (step 302).

Figure 4:
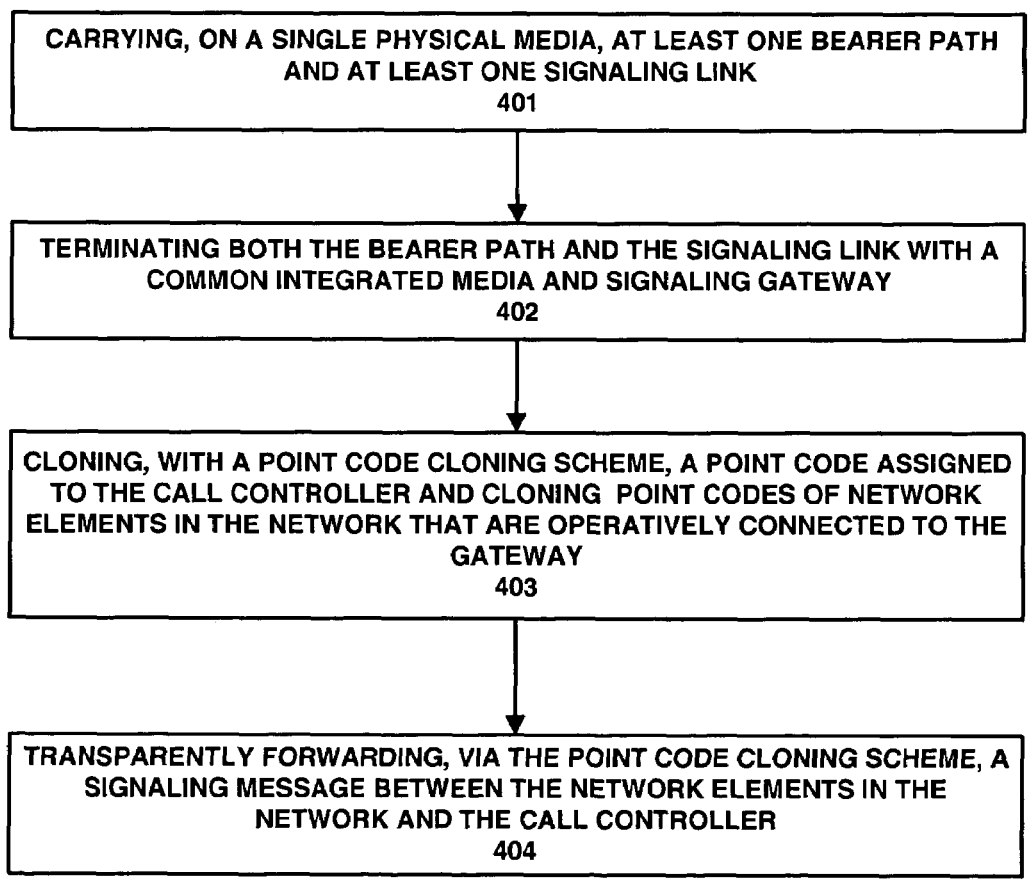
FIG. 4 illustrates another flow chart of logical operational steps that may be followed in accordance with one embodiment of the present method and system.

FIG. 4 depicts a more detailed embodiment of the present method. In this embodiment the method has the steps of: carrying, on a single physical media, at least one bearer path and at least one signaling link (step 401); terminating the bearer paths and the signaling links with a common integrated media and signaling gateway (step 402); cloning, with a point code cloning scheme, a point code assigned to the call controller and cloning point codes of network elements in the network that are operatively connected to the gateway (step 403); and transparently forwarding, via the point code cloning scheme, a signaling message between the network elements in the network and the call controller. More specifically, the point code cloning scheme transparently forwards a SS7 signaling message between the SS7 network and the call controller.

Also, the SS7 signaling message is transparently forwarded to a selected call controller without the integrated signaling gateway's own point code. Incoming signaling to the integrated signaling gateway is at least one of TDM based narrowband signaling and ATM based broadband signaling. This at least one of TDM based narrowband signaling and ATM based broadband signaling is converted to IP based network signaling with M3UA.

The present method and system overcome the drawbacks of prior art systems, which required separated signaling gateway and media gateway dedicated to different functions. In these prior art systems different point codes are needed for the signaling gateway and the call controller, and routing entries are needed to reach the call controller.

The novel features of the present method and system include, for example; both bearer paths and signaling links being carried on the same physical media, one integrated unit terminating both bearer paths and signaling links, both ATM based broadband or TDM based narrowband signaling, and a point code cloning scheme that allows the integrated signaling gateway to transparently forward the signaling message between the signaling network and the call controller. Thus, no routing is required.

The method and system of the present invention may be implemented in hardware, software, or combinations of hardware and software. In a software embodiment, portions of the present invention may be computer program products embedded in computer readable medium. Portions of the system may employ and/or comprise a set and/or series of computer instructions written in or implemented with any of a number of programming languages, as will be appreciated by those skilled in the art.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. For example, the wireless access gateway may be utilized in UMTS, GSM, and CDMA systems. The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

I claim:

1. A system for terminating bearer paths and signaling links with a common integrated media and signaling gateway, comprising:
    a single physical media carrying at least one bearer path and at least one signaling link;
    an integrated media and signaling gateway operatively connected to the physical media, the integrated media and signaling gateway being a termination for both the bearer path and the signaling link;
    at least one call controller operatively connected to the integrated media and signaling gateway; and
    a point code cloning scheme for transparently forwarding a signaling message, which is received on the signaling link, to the at least one call controller.

2. The system according to claim 1, wherein the system further comprises a plurality of call controllers operatively connected to the integrated media and signaling gateway, and wherein the point code cloning scheme transparently forwards a signaling message, which is received on the signaling link, to a selected call controller of the plurality of call controllers.

3. The system according to claim 1, wherein the system further comprises signaling on the incoming signaling links to the integrated media and signaling gateway is at least one of TDM based narrowband signaling and ATM based broadband signaling.

4. The system according to claim 3, wherein the signaling link is an SS7 signaling link, wherein the integrated media and signaling gateway has a signaling processing unit, and wherein the signaling processing unit converts the at least one of TDM based narrowband signaling and ATM based broadband signaling to IP based network signaling with M3UA (MTP3 User Adaption Layer).

5. A system for terminating bearer paths and signaling links with a common integrated media and signaling gateway, comprising:
- a single media carrying at least one bearer path in a bearer logical channel and at least one signaling link in a signaling logical channel;
- an integrated media and signaling gateway having a bearer processing unit that is a termination for the bearer logical channel and a signal processing unit that is a termination for the signaling logical channel;
- a network operatively connected to the bearer processing unit, the network having network elements, the network elements having respectively assigned thereto point codes according to a point code cloning scheme; and
- at least one call controller operatively connected to the signal processing unit, the call controller having assigned thereto a point code according to the point code cloning scheme.

6. The system according to claim 5, wherein the point code cloning scheme effects a transparent forwarding of a signaling message, which is received on the signaling link, to the call controller.

7. The system according to claim 5, wherein the system further comprises a plurality of call controllers operatively connected to the integrated media and signaling gateway, and a point code cloning scheme for forwarding a signaling message, which is received on the signaling link, to a selected call controller of the plurality of call controllers.

8. The system according to claim 5, wherein incoming signaling to the integrated media and signaling gateway is at least one of TDM based narrowband signaling and ATM based broadband signaling.

9. The system according to claim 8, wherein the signaling processing unit converts the at least one of TDM based narrowband signaling and ATM based broadband signaling to IP based network signaling with M3UA.

10. A method for terminating bearer paths and signaling links with a common integrated media and signaling gateway, comprising:
- carrying, on a single physical media, at least one bearer path and at least one signaling link; and
- terminating the bearer paths and the signaling links with a common integrated media and signaling gateway, at least one call controller operatively connected to the integrated media and signaling gateway; and
- using a point code cloning scheme for transparently forwarding a signaling message, which is received on the signaling link, to the at least one call controller.

11. The method according to claim 10, wherein a plurality of call controllers is operatively connected to the integrated signaling gateway, and wherein the method further comprises using the point code cloning scheme for transparently forwarding a signaling message, which is received on the signaling link, to a selected call controller of the plurality of call controllers.

12. The method according to claim 10, wherein signaling on the incoming signaling link to the integrated signaling gateway is at least one of TDM based narrowband signaling and ATM based broadband signaling.

13. The method according to claim 12, wherein the method further comprises converting the at least one of TDM based narrowband signaling and ATM based broadband signaling to IP based network signaling with M3UA.

14. A method for terminating bearer paths and signaling links with a common integrated media and signaling gateway, comprising:
- carrying, on a single physical media, at least one bearer path and at least one signaling link; and
- terminating the bearer paths and the signaling links with a common integrated media and signaling gateway;
- cloning, with a point code cloning scheme, a point code that is respectively assigned to at least one call controller that is operatively connected to the gateway, and cloning further point codes that are assigned to network elements in a network that is operatively connected to the gateway; and
- transparently forwarding, via the point code cloning scheme, a signaling message between the network elements in the network and the call controller.

15. The method according to claim 14, wherein a plurality of call controllers are operatively connected to the gateway, and wherein the method further comprises transparently forwarding the signaling message to a selected call controller of the plurality of call controllers.

16. A system for terminating bearer paths and SS7 signaling links with a common integrated media and signaling gateway, comprising:
- a singe media carrying at least one bearer path in a bearer logical channel and at least one signaling link in a signaling logical channel;
- an integrated media and signaling gateway having a bearer processing unit that is a termination for the bearer logical channel and a signal processing unit tat is a termination for the signaling logical channel;
- a signaling message, which is received by the integrated media and signaling gateway via the signaling link, being at least one of TDM based narrowband signaling and ATM based broadband signaling;
- the signaling processing unit being a termination for the signaling links on the at least one of TDM based narrowband signaling and ATM based broadband signaling, the integrated media and signaling gateway containing an SS7 signaling stack, and the integrated media and signaling gateway being a termination for the SS7 signaling stack;
- the bearer processing unit being a termination for the bearer path, the integrated media and signaling gateway containing an bearer stack, and the integrated media and signaling gateway being a termination for the bearer stack;
- a network operatively connected to the bearer processing unit, the network having network elements, the network elements having respectively assigned thereto point codes according to a point code cloning scheme; and
- at least one call controller operatively connected to the signal processing unit, the call controller having assigned thereto a point code according to the point code cloning scheme.

17. The system according to claim 16, wherein the point code cloning scheme effects a transparent forwarding of an SS7 signaling message, which is received on the SS7 signaling link, to the call controller.

18. The system according to claim 16, wherein the system further comprises a plurality of call controllers operatively connected to the integrated media and signaling gateway, and a point code cloning scheme for forwarding a signaling message, which is received on the signaling link, to a selected call controller of the plurality of call controllers.

19. The system according to claim 16, wherein the signaling processing unit converts the at least one of TDM based narrowband signaling and ATM based broadband signaling to IP based network signaling with M3UA.

20. The system according to claim 16, wherein the gateway receives SS7 signaling using MTP as transport over the signaling link, and wherein the signaling processing unit terminates the SS7 signaling stack up to an MTP3 layer.

21. The system according to claim 16, wherein the gateway receives SS7 signaling using MTP as transport over the signaling link, and wherein the bearer processing unit terminates the bearer stack up to a voice encoding layer.

* * * * *